(12) United States Patent
Faris

(10) Patent No.: US 8,415,917 B1
(45) Date of Patent: Apr. 9, 2013

(54) ARTICLE WITH INTEGRATED OUTLET AND BUCKLE

(76) Inventor: Paul J. Faris, Campbellsport, WI (US)

( * ) Notice: Subject to any disclaimer, the term of this patent is extended or adjusted under 35 U.S.C. 154(b) by 869 days.

(21) Appl. No.: 12/557,948

(22) Filed: Sep. 11, 2009

Related U.S. Application Data

(60) Provisional application No. 61/096,579, filed on Sep. 12, 2008.

(51) Int. Cl.
*H02J 7/00* (2006.01)
*H02J 7/02* (2006.01)
*H02J 7/14* (2006.01)
*A44B 11/00* (2006.01)

(52) U.S. Cl. ........ 320/107; 320/111; 320/112; 320/114; 224/163

(58) Field of Classification Search ............... 320/107, 320/111; 224/163
See application file for complete search history.

(56) References Cited

U.S. PATENT DOCUMENTS

| 3,274,476 A | 9/1966 | Wildum |
| 3,919,615 A | 11/1975 | Niecke |
| 4,748,344 A * | 5/1988 | Sing .............................. 307/150 |
| 5,680,026 A * | 10/1997 | Lueschen ........................ 429/97 |
| 6,501,197 B1 | 12/2002 | Cornog et al. |
| 6,577,098 B2 | 6/2003 | Griffey et al. |
| 6,939,641 B2 | 9/2005 | Kincaid et al. |

* cited by examiner

*Primary Examiner* — Edward Tso
*Assistant Examiner* — Ahmed Omar
(74) *Attorney, Agent, or Firm* — Brannen Law Office, LLC

(57) ABSTRACT

The present invention can have an article comprising a belt with two ends that can be selectably fastened together. A power source and an inverter can be secured within the belt. A buckle with an integrated outlet can be utilized within the belt. The buckle first piece has two cavities that each can have an electrical contact therein. A bridge can electrically connect the contacts. A second buckle piece can have first and second arms that are received within the cavities, respectively, of the first piece. The second piece can engage the first piece in two distinct positions, wherein in the first position the buckle is fastened but no electrical connection is made therein, and in the second position an electric circuit is completed. Breaking the electrical connection within the buckle electrically separates the power source and the inverter to prevent drawdown of the power source.

19 Claims, 5 Drawing Sheets

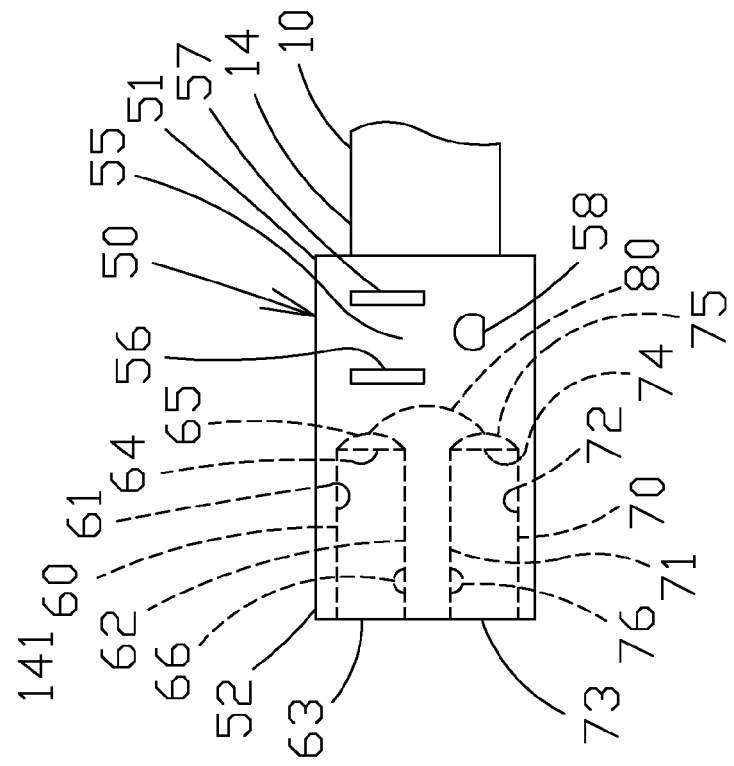
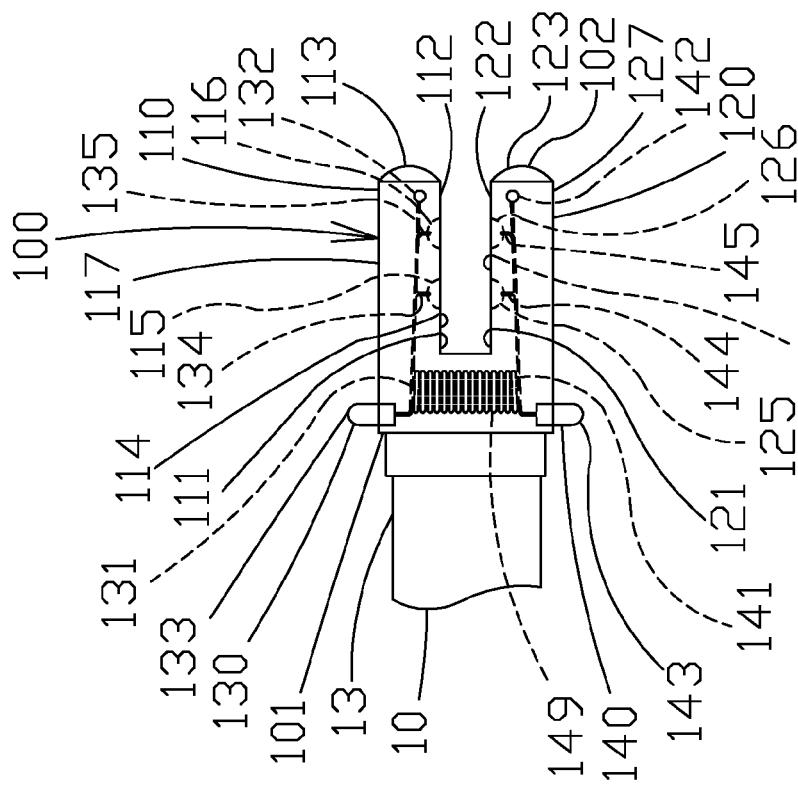
FIG. 3
FIG. 2

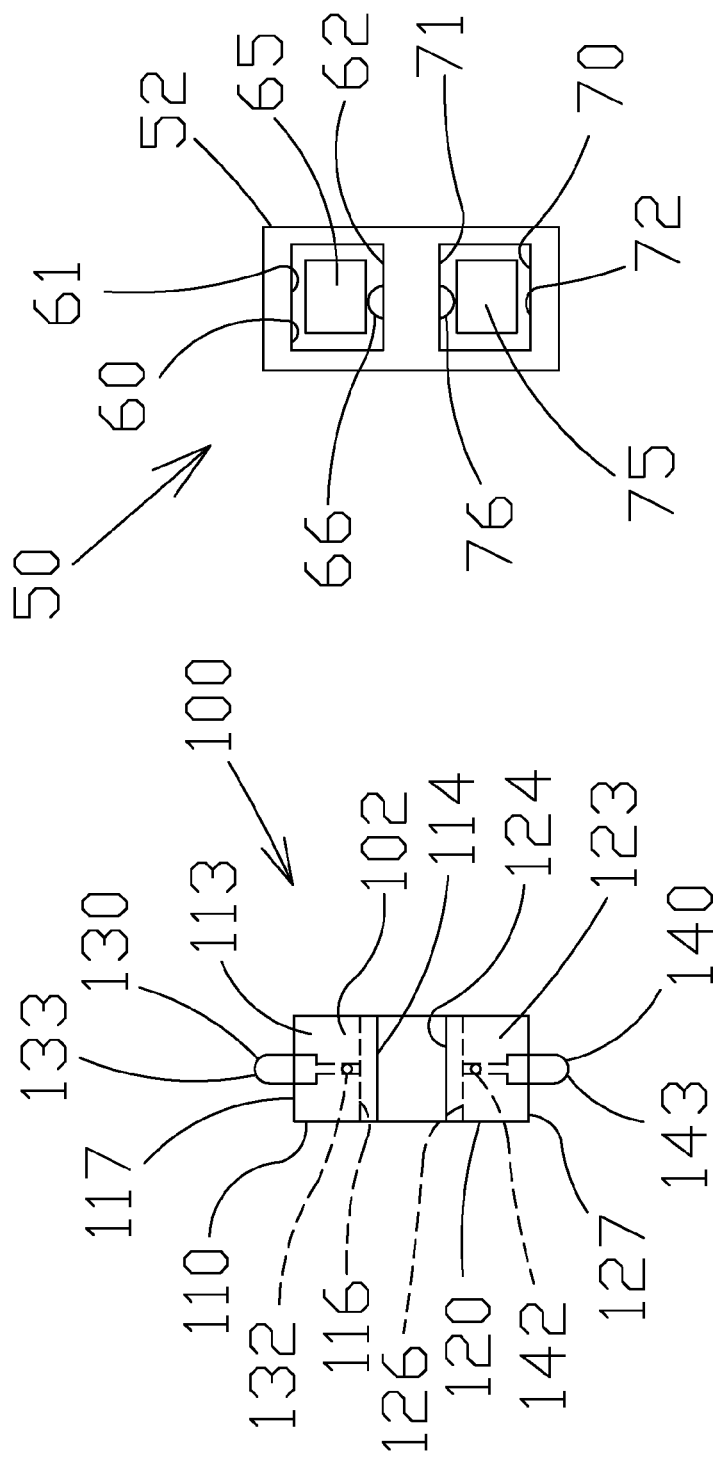

ARTICLE WITH INTEGRATED OUTLET AND BUCKLE

This application claims priority on and the benefit of provisional application 61/096,579, filed Sep. 12, 2008, which remains currently pending, the entire contents of which are hereby incorporated herein by reference.

BACKGROUND OF THE INVENTION

1. Field of the Invention

The present invention relates to an article with a power source such as a battery, an inverter and an outlet, the outlet being integrated into a buckle with a disconnect to electrically separate the inverter from the power source.

2. Description of the Related Art

Cordless power tools are of widely used in modern society, and are gaining in popularity every year. A person can now buy an entire set of cordless tools, such as cordless drills and circular and reciprocating saws, among other tools, each powered by a variety of rechargeable batteries. Each individual tool has a mechanism for removably affixing a rechargeable battery to the tool. Many or most manufacturers sell sets of tools so that a single style and size battery can be interchanged between the entire line-up of tools as necessary.

Yet, in order to enjoy the full cross-use of a battery with all of a given user's tools, it is implicitly required that all the tools in the inventory have the same battery ports. In practice, this requires that the entire inventory of tools be made by the same manufacturer. Purchasing an entire inventory of cordless tools is an expensive endeavor. Each tool made by each manufacturer has its own respective strengths and weaknesses. It may sometimes be desirable to purchase a given cordless tool without respect to its ability to cross-use the batteries. Further, improvements over time may lead to changes in the design of the batteries. This could lead to incompatibility between the old and new generations of cordless tools even within a particular manufacturer's cordless tool line-up.

Having cordless tools from several manufactures can likewise have drawbacks. Importantly, each battery must remain charged, or at least be charged prior to use. This may requires that several docks may be used simultaneously. Further, for tools that are used infrequently, having the battery constantly on the dock or charger may undesirably lead to wasteful or inefficient use of energy.

A further disadvantage of cordless tools is their weight. Cordless tools tend to be heavier then their respective corded counterpart. This is primarily due to the weight of the rechargeable battery that is directly connected to the body of the cordless tool. It can be cumbersome to repeatedly use a cordless tool for an extended period of time. The cumbersomeness can be exasperated when using a cordless tool to reach overhead. The ensuing fatigue can lead to dissatisfaction with the use of the cordless tool, and can even be dangerous. Fatigue can cause a loss of precision and encourage inappropriate use of the tool.

Further, there are many people having an extensive inventory of corded tools. For those people, it is an expensive proposition to transition to a cordless system. This is especially true if the user intends to purchase an entire set from a manufacturer.

Still further, some people who have used corded tools have experienced the frustrating situation where the cord to the power source is not quite long enough. More frustrating, when using a corded tool up on a ladder, the cord can pull out of the wall as the user reaches to use the tool. Such an occurrence, in addition to being frustrating, can increase the time required to complete a task. Still further, a user must have an extension cord to use the corded tool when not in close proximity to an outlet. It is possible that the user may not have an extension cord with sufficient length, thereby rendering the corded tool useless for some applications.

There have been several inventions over the years seeking to solve problems in the area of providing battery packs for desired applications. While each of the inventions may work well for their intended purposes, none of the inventions solve the problem of using standard corded tools remote from a wall outlet without the use of an extension cord. Some examples include:

U.S. Pat. No. (Hereafter "U.S. Pat. No.") 3,274,476 discloses an article carrying belt suitable for use with electrical devices requiring a DC output. No inverter is shown for converting to an AC power outlet.

U.S. Pat. No. 3,919,615 teaches a power belt having a belt member, a plurality of pockets for containing electrical cells and an inverter, and a socket. The socket is disclosed to be a standard socket for a movie camera. No socket is shown for receiving standard plugs, such as the ones used with a corded power tool.

U.S. Pat. No. 4,748,344 shows a portable power supply carrier. This patent also shows an inverter. A plug is shown for being inserted into an appliance. Yet, no socket is shown for receiving a plug.

U.S. Pat. No. 6,501,197 shows a power tool and convertible remote battery pack having a plug for being received in the socket of a battery-powered hand power tool. This patent does not show a plug for being used with a corded tool.

Other inventions disclose mobile AC power system. One example is U.S. Pat. No. 6,577,098, which shows an apparatus for providing a mobile AC power supply having an inverter and an outlet. However, this patent does not teach the use of a belt or other apparatus for fastening to an individual or otherwise remaining in close proximity to an individual.

Another patent, U.S. Pat. No. 6,939,641, teaches a detached portable battery with universal clip. However, the electrical coupling disclosed in this patent does not appear to be a socket for which a conventional two or three pronged plug can be inserted.

None of these patents show an article having a buckle with an integrated outlet.

None of these patents show a disconnect for electrically separating the power source from the inverter to prevent drawdown when the article is not in use.

Thus there exists a need for an article mounted battery pack with outlet that solves these and other problems.

SUMMARY OF THE INVENTION

The present invention relates to an article with a power source such as a battery, an inverter and an outlet, the outlet being integrated into a buckle with a disconnect to electrically separate the inverter from the power source.

In a preferred embodiment, the present invention can have an article comprising a belt with two ends that can be selectably fastened together to secure the belt around the waste of a user. A battery and an inverter can be secured within the belt. A buckle with an integrated outlet can be utilized within the belt. The buckle first piece has two cavities that each can have an electrical contact therein. A bridge can electrically connect the contacts. The first piece can further have an integrated outlet. A second buckle piece can have first and second arms that are received within the cavities, respectively, of the first piece. The second piece can engage the first piece in two distinct positions, wherein in the first position the buckle is fastened but no electrical connection is made and in the second position an electric circuit is completed between the first piece and the second piece. Breaking the electrical connection within the buckle electrically separates the power source and the inverter to prevent drawdown of the power source.

According to one advantage of the present invention, it is known that corded tools are generally lighter than their cordless counterparts. The battery for use with the present invention is supported on the user's body, rather than directly connected to the tool. This greatly reduces fatigue for the user when using the present invention in comparison to use of standard cordless tools. Reduction of fatigue is known to increase safety, and reduce the risk of injury or improper use of the tool.

Still further, the present invention can be used anywhere, regardless of the location of the nearest standard wall outlet. In this regard, a user of the present invention will be able to freely use corded tools even in the absence of an extension cord. Further, there is no chance that a user of the present invention could pull a cord out of the wall by being at the length limits of the extension cord, as no extension cord is used.

Still further yet, users of the present invention will be able to use their full inventory of corded tools with the present invention, regardless of make or model. Advantageously, the user will be able to select any given tool based on quality, price, or any other consideration other than whether it is compatible with their other tools (more specifically, a specific style or size rechargeable battery).

Still further yet, the present invention is has a buckle with an integrated outlet that is usable by both right and left handed people.

Still further yet, the buck has a disconnect wherein the buckle may remain fastened even though the internal electrical connection is separated. In this regard, the buckle must be fully engaged in order to electrically connect the power source and the inverter, thereby reducing unwanted drawdown.

Other advantages, benefits, and features of the present invention will become apparent to those skilled in the art upon reading the detailed description of the invention and upon studying the drawings.

BRIEF DESCRIPTION OF THE DRAWINGS

FIG. 2 is a side view of one piece of an embodiment of a buckle of the present invention.

FIG. 3 is a side view of a second piece of an embodiment of a buckle of the present invention showing an integrated outlet.

FIG. 4 is an end view of the piece shown in FIG. 2.

FIG. 5 is an end view of the piece shown in FIG. 3.

DETAILED DESCRIPTION OF THE PREFERRED EMBODIMENTS

Figure 1:
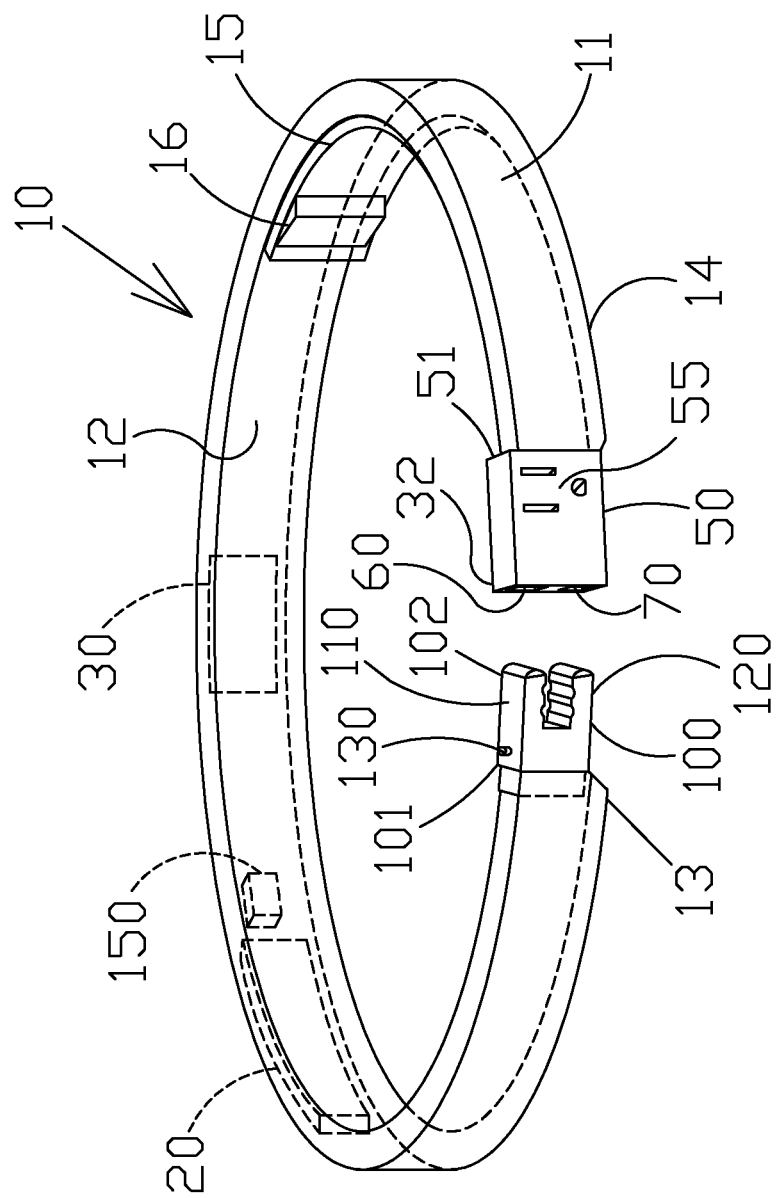
FIG. 1 is a perspective view of an embodiment of the present invention.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

It is understood that the present invention is intended for use with standard corded items, such as a corded tool. A typical corded tool has a body for housing the working component. Examples of the working components are drills, screw drivers, saws, trimmers, sanders, etc. The tools have a handle that a user can grip while using the tool. A cord is provided for harnessing AC power to power the tool. The cord has two ends. The first end is electrically connected to the body of the tool, and a plug is connected to the second end of the cord. The plug has at least two prongs of standard configuration. A third prong, a ground prong, can also be provided for insertion into an outlet.

Turning now to FIGS. 1-7, it is seen that an article, such as a belt 10, is illustrated. It is understood that the article 10 can be an alternative structure, such as a vest, back pack, or other body supported structure (collectively not shown) without departing from the broad aspects of the present invention. The belt 10 has an inside 11 and an outside 12. Ends 13 and 14 are provided. The length of the belt 10 can be adjusted with an expansion piece 15 secured with a clamp 16. In this regard, the belt can selectably have a larger or smaller size. While the belt is shown to have an interior dimension, it is understood that other shaped could be used without departing from the broad aspects of the present invention.

One preferred power source is a battery 20. While the battery is shown generically as a block, it is understood that the battery may be comprised of many individual cells arranged around the perimeter of the article 10. One preferred type of battery is a rechargeable lithium-ion battery. Yet, it is understood that other types of rechargeable power sources may be used without departing from the broad aspects of the present invention.

An inverter 30 is provided for inverting the dc power stored in the power source to ac power that may be utilized by the corded tools. The inverter 30 is illustrated generically and may be comprised of any suitable brand.

A buckle 40 is further provided. The buckle 40 is preferably comprised of a first piece 50 and a second piece 100. The buckle is preferably made of a plastic or other suitable material.

The first piece 50, best shown in FIGS. 1, 3, 5 and 6, preferably has ends 51 and 52, and comprises an outlet 55, a cavity 60, a cavity 70 and an electric bridge 80. Each of these components is described below.

The outlet 55 is preferably a standard outlet having holes 56, 57, and 58 respectively that are sized and spaced appropriately to receive a plug of standard two and three pronged tools. In the preferred embodiment, the outlet 55 is adjacent the first end 55 of the first piece 50.

Cavity 60 has a top 61, a bottom 62, an open end 63 and an interior end 64. An electric contact 65 is preferably located on the interior end 64, wherein it may be selectably electrically connected to an object fully received within the cavity 60. A rib 66 is further provided within the cavity 60. The rib preferably protrudes up from the wall at the bottom 62 of the cavity.

Cavity 70 has a top 71, a bottom 72, an open end 73 and an interior end 74. An electric contact 75 is preferably located on the interior end 74, wherein it may be selectably electrically connected to an object fully received within the cavity 70. A rib 76 is further provided within the cavity 70. The rib preferably protrudes down from the wall at the top 71 of the cavity.

The electric bridge 80, or simply bridge, is an electrical connection between contact 65 and contact 75.

The second piece 100 is best shown in FIGS. 1, 2, 4 and 6. The second piece 100 has opposed ends 101 and 102, and comprises a first arm 110, a second arm 120, and a release.

The first arm 110 has ends 111 and 112. An electric contact 113 is preferably at the second end 112 of arm 110. The arm further has an inside surface 114 and an outside surface 117. Two slots 115 and 116 are preferably located on the inside surface of the first arm 110. The slots 115 and 116 are spaced apart, and are sized and shaped to selectably mate with rib 66 of cavity 60.

The second arm 120 has ends 121 and 122. An electric contact 123 is preferably at the second end 122 of arm 120. The arm further has an inside surface 124 and an outside surface 127. Two slots 125 and 126 are preferably located on the inside surface of the first arm 120. The slots 125 and 126 are spaced apart, and are sized and shaped to selectably mate with rib 76 of cavity 70.

Electric contact 113 engages contact 65 when slot 115 is mated with rib 66. This is the engagement when the second piece is in full engagement with the first piece. Electric contact 123 engages contact 75 when slot 125 is mated with rib 76. When slot 116 is mated with rib 66 and slot 126 is mated with rib 76, the first piece 50 is engaged to and secured to the second piece 100, but there is no electrical connection there between.

Release 130 has an arm 131 with a pivot 132 on one end and a protrusion 133 on the other. Pins 134 and 135 are connected to the pivoting arm 131 and can be projected into slots 115 and 116, respectively, to allow the buckle to disengage the rib 65.

Release 140 has an arm 141 with a pivot 142 on one end and a protrusion 143 on the other. Pins 144 and 145 are connected to the pivoting arm 141 and can be projected into slots 125 and 126, respectively, to allow the buckle to disengage the rib 75.

A spring 149 is preferably provided for biasing release 130 away from release 140, so that disengagement of the first piece 50 and the second piece 100 only occurs under direction and affirmative act of the user. It is appreciated that other types of biasing apparatuses may be used without departing from the broad aspects of the present invention.

Figure 6:
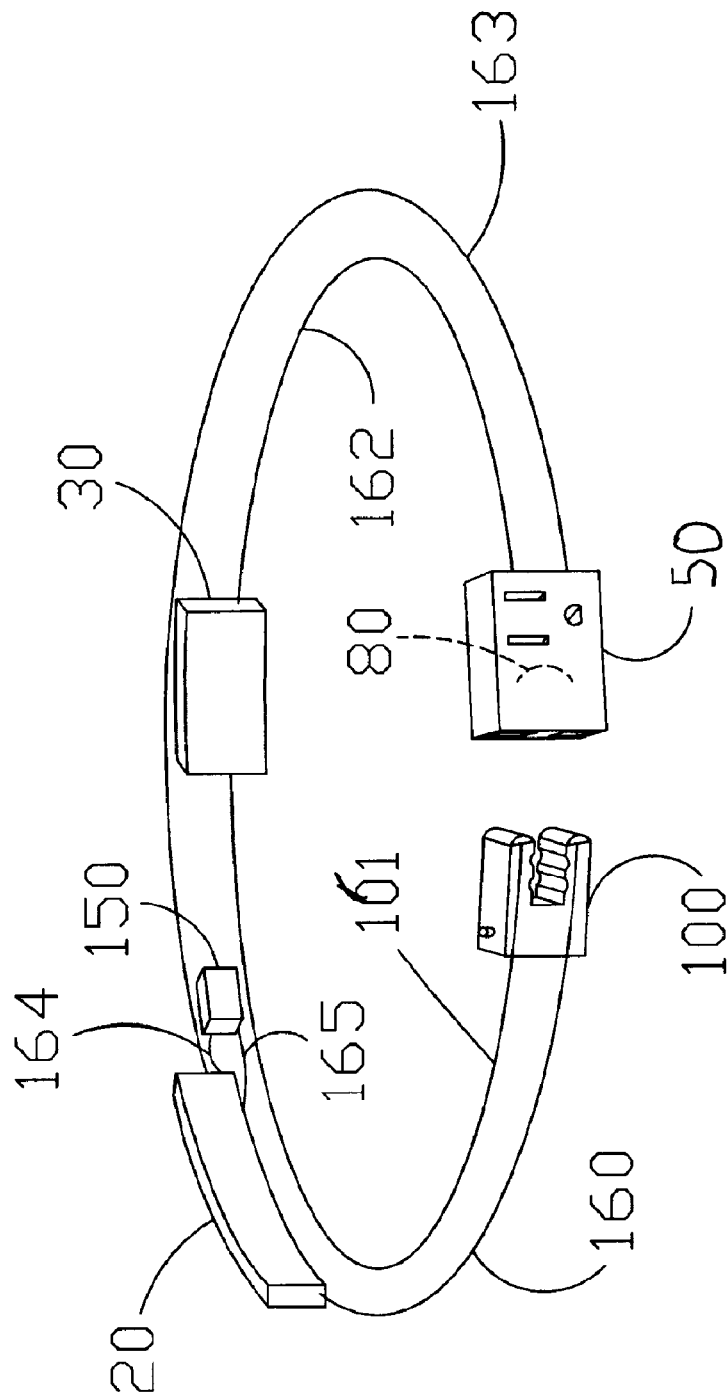
FIG. 6 is a schematic view showing the electrical circuitry of one embodiment of the present invention.
Figure 7:
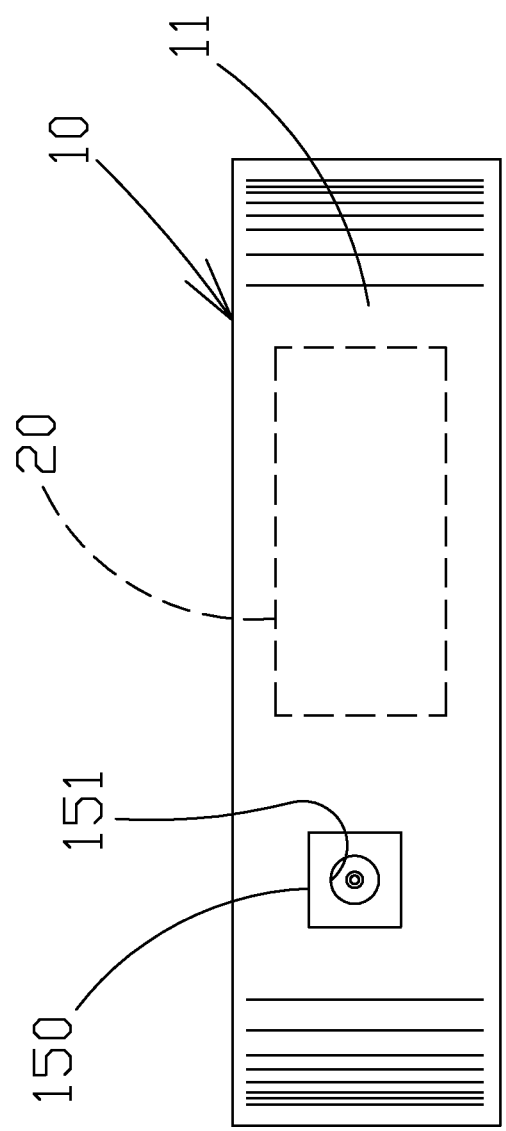
FIG. 7 is a side view of an embodiment of the present invention showing a charging port.

Looking now to FIGS. 1, 6 and 7, it is seen that a charge port 150 is illustrated. The charge port 150 has a hole 151 wherein a charging plug can be inserted to recharge the battery. The charging of the battery may occur independent of the inverter circuitry.

Looking now specifically to FIG. 6, it is seen that the electronic layout is shown schematically. Wire 160 is shown to connect the battery 20 to the contact 123. Wire 161 is shown to connect the contact 113 to the inverter. Wire 162 is shown to connect the inverter 30 to the outlet 55. Wire 163 is shown to connect the outlet 55 to the battery 20. This circuit is only completed when the first piece 50 is fully received within the second piece 100, whereby bridge 80 can complete the circuit.

Wires 164 and 165 are illustrated to interconnect the battery 20 and the charging port 150.

While a bridging electric component is illustrated herein, it is appreciated that a manual toggle switch could also be used without departing from the broad aspects of the present invention.

Thus it is apparent that there has been provided, in accordance with the invention, an article with a battery holder, an inverter and an outlet that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An article comprising:
    a battery supported by said article;
    a buckle comprising a first piece and a second piece wherein:
        said first piece is received within said second piece; and
        engagement of said first piece and said second piece results in an electrical connection; and
    an outlet integrated into said buckle.

2. The article of claim 1 wherein:
    said first piece comprises an electrical bridge; and
    said second piece comprises a first arm and a second arm, wherein said electrical bridge completes an electronic connection between said first arm and said second arm when said second piece is received within said first piece.

3. The article of claim 2 wherein:
    said first piece comprises a first hole having a first hole rib, and a second hole having a second hole rib;
    said first arm has a first arm first slot and a first arm second slot;
    said second arm has a second arm first slot and a second arm second slot,
    said buckle first piece is engaged without an electrical connection with said second piece when said first hole rib is received within said first arm first slot and said second hole rib is received within said second arm first slot; and
    said buck first piece is engaged with an electrical connection with said second piece when said first hole rib is received within said first arm second slot and said second hole rib is received within said second arm second slot.

4. The article of claim 3 wherein:
    said first arm and said second arm are generally parallel to each other; and
    said second piece further comprises a release operable to move said first hole rib and said second hole rib from said first arm first slot, said first arm second slot, said second arm first slot and said second arm second slot, respectively.

5. The article of claim 1 further comprising an inverter, wherein alternating current is available at said outlet.

6. The article of claim 5 wherein a direct electrical connection between said battery and said inverter passes through said buckle.

7. The article of claim 1 wherein said article is a belt.

8. The article of claim 1 wherein said outlet comprises three holes.

9. An article comprising:
    a battery;
    an inverter;
    an outlet; and
    a buckle with integrated electronics, wherein said outlet is operable when said buckle is fully engaged and inoperable when said outlet is less than fully engaged.

10. The article of claim 9 wherein said outlet is integrated into said buckle.

11. The article of claim 10 wherein said buckle further comprises:
    a first piece with an electrical bridge; and
    a second piece with a first arm and a second arm,
    wherein said electrical bridge completes an electronic connection between said first arm and said second arm when said second piece is received within said first piece.

12. The article of claim 11 wherein:

said first piece comprises a first hole having a first hole rib, and a second hole having a second hole rib;

said first arm has a first arm first slot and a first arm second slot;

said second arm has a second arm first slot and a second arm second slot, said buckle first piece is engaged without an electrical connection with said second piece when said first hole rib is received within said first arm first slot and said second hole rib is received within said second arm first slot; and said buck first piece is engaged with an electrical connection with said second piece when said first hole rib is received within said first arm second slot and said second hole rib is received within said second arm second slot.

13. The article of claim 12 wherein:

said first arm and said second arm are generally parallel to each other; and said second piece further comprises a release operable to move said first hole rib and said second hole rib from said first arm first slot, said first arm second slot, said second arm first slot and said second arm second slot, respectively.

14. An article comprising:

a battery;

an outlet; and a buckle having a first piece and a second piece, wherein:

said first piece comprises a first hole having a first hole rib, and a second hole having a second hole rib;

said second piece comprises a first arm having a first arm first slot and a first arm second slot and a second arm having a second arm first slot and a second arm second slot, said buckle first piece is engaged without an electrical connection with said second piece when said first hole rib is received within said first arm first slot and said second hole rib is received within said second arm first slot; and said buck first piece is engaged with an electrical connection with said second piece when said first hole rib is received within said first arm second slot and said second hole rib is received within said second arm second slot.

15. The article of claim 14 wherein said first piece comprises an electrical bridge that completes an electrical connection between said first arm and said second arm when said first hole rib is received within said first arm second slot and said second hole rib is received within said second arm second slot.

16. The article of claim 14 wherein said outlet is integrated into said buckle.

17. The article of claim 14 further comprising a buckle, wherein alternating current is available at said outlet.

18. The article of claim 14 wherein said article is a belt.

19. An article comprising:

a battery supported by said article;

a buckle;

an outlet integrated into said buckle; and an inverter, wherein:

alternating current is available at said outlet; and a direct electrical connection between said battery and said inverter passes through said buckle.

* * * * *